United States Patent [19]

Dewitz

[11] Patent Number: 4,810,264

[45] Date of Patent: Mar. 7, 1989

[54] PROCESS FOR CLEANING AND SPLITTING PARTICLE-CONTAINING FLUID WITH AN ADJUSTABLE CYCLONE SEPARATOR

[75] Inventor: Thomas S. Dewitz, Houston, Tex.

[73] Assignee: Shell Oil Company, Houston, Tex.

[21] Appl. No.: 57,655

[22] Filed: Jun. 8, 1987

Related U.S. Application Data

[63] Continuation of Ser. No. 915,930, Oct. 6, 1986, abandoned, which is a continuation of Ser. No. 728,134, Apr. 29, 1985, abandoned, which is a continuation-in-part of Ser. No. 582,688, Feb. 23, 1984, abandoned.

[51] Int. Cl.[4] .......................... B01D 45/12; B04C 3/02; C10J 3/84

[52] U.S. Cl. .................................. 48/210; 48/DIG. 2; 55/69; 55/80; 55/393; 55/459 R; 55/459.1; 210/787; 210/512.3; 422/147

[58] Field of Search .................... 55/52, 55, 57, 68, 80, 55/391, 394, 393, 459 R; 48/197 R, 202, 206, 210, DIG. 2; 209/144, 211; 210/787, 512.2, 512.3; 422/147

[56] References Cited

U.S. PATENT DOCUMENTS

| | | | |
|---|---|---|---|
| 1,761,627 | 6/1930 | Hine | 55/459 R |
| 2,148,168 | 2/1939 | McGinitie | 55/459 R |
| 2,849,117 | 8/1958 | Rietema | 55/459 R |
| 3,232,430 | 2/1966 | Saint-Jacques | 55/459 R |
| 3,802,570 | 4/1974 | Dehne | 55/391 |
| 4,005,998 | 2/1977 | Gorman | 55/426 |
| 4,123,364 | 10/1978 | Mozley | 210/512.2 |
| 4,147,630 | 4/1979 | Laval | 55/459 R |
| 4,173,527 | 11/1979 | Heffley | 208/153 |
| 4,342,897 | 8/1982 | Murai | 55/459 R |
| 4,455,220 | 6/1984 | Parker | 55/459 R |
| 4,482,363 | 11/1984 | Mink | 48/210 |

*Primary Examiner*—Ernest G. Therkorn

[57] ABSTRACT

A stream of particle-containing fluid (e.g. from coal gasification or combustion) can be cleaned and split by flowing it into and through the vortex of a cyclone in which an externally adjustable vortex stabilizing means is moved close enough to the outlet opening for the particle-depleted fluid to provide an outflow of such fluid having a selected volume or particle concentration.

3 Claims, 4 Drawing Sheets

PROCESS FOR CLEANING AND SPLITTING PARTICLE-CONTAINING FLUID WITH AN ADJUSTABLE CYCLONE SEPARATOR

CROSS REFERENCE TO RELATED APPLICATIONS

This is a continuation, filed Oct. 6, 1986, now abandoned, which is continuation of Ser. No. 728,134, filed Apr. 29, 1985, now abandoned which is a continuation-in-part of application Ser. No. 582,688, filed Feb. 23, 1984, now abandoned.

BACKGROUND OF THE INVENTION

The present invention relates to a process for cleaning and separating a stream of particle-containing fluid. More particularly, the invention relates to treating such a stream without materially reducing its heat or energy content, or causing significant erosion of stream-splitting components, by flowing the stream into and out of the vortex of a cyclone while adjusting a remotely controllable vortex stabilizer within the cyclone to provide a selected rate of outflow of treated fluid.

Various cyclone separators have been described in patents such as the following: U.S. Pat. No. 3,235,090 describes a cyclone separator for separating dirt particles from dry cleaning fluid. U.S. Pat. No. 3,313,413 describes a cyclone separator for removing particles from paper pulp stock. U.S. Pat. No. 3,489,286 describes a cyclone separator with baffles for preventing the return of the outflowing separated particles. U.S. Pat. No. 3,529,724 describes a cyclone separator with a barrier filter in the particle collecting chamber. U.S. Pat. No. 3,645,401 describes a cyclone separator with baffles mounted in a fixed position below the normal vortex to reduce the centrifugal force and thus reduce the tendency for sticky particles to accrete on walls near the particle-outlet opening. U.S Pat. No. 3,802,570 describes a cyclone separator containing a truncated tube mounted in the lower end of a vortex tube to function as a vortex-stabilizer for centering and stabilizing the vortex near the mouth of the particle outlet. U.S. Pat. No. 4,212,653 describes a cyclone separator containing an inlet near the top of the vortex tube for a co-swirling stream of gas and a near-bottom located vortex stabilizing base plug or vortex shield.

Various reaction processes produce streams of particle-containing fluids which need to be divided, or controlled, or freed of particles in order to recover heat or energy, or provide relatively clean fluid for re-use or further processing. Such situations are commonplace in converting solid, or substantially solid, carbonaceous materials such as coals, tars and lignites, or the like, to synthetic fuels, etc. For example, U.S. Pat. No. 3,963,457 describes a coal gasification process in which cooled and cleaned recycled gas, from which particulate matter, such as vaporized, molten or solid slag or fly ash, have been removed in order to cool the product gas as it leaves the gasifier unit. U.S. Pat. No. 4,054,424 describes a slagging coal gasifier with a similar quenching of the product gas in a quench zone into which a shielding gas is introduced between the product gas and the walls of the vessel. U.S. Pat. No. 4,149,859 describes a process for separating particles from a hot gas, such as that formed during coal gasification, by means of a sequence of cooling and separating steps, to provide both a particle-free gas and a suspension of particles for use in a quenching process.

In view of the prior art, it was previously known to use a cyclone separator arranged for receiving and separating particle-suspending gaseous or liquid fluids. Such separators sometimes used vortex stabilizers to increase the efficiency with which solid or liquid particles were separated by being moved radially outward and downward past the vortex-stabilizer with the stabilizer being located at, or somewhat below, the natural turning point of the vortex. Such a location for a vortex stabilizer was thought to be its best location for its main function of maintaining an adequate downward and outward expulsive force on the separated particles. As far as applicant is aware, it was not previously recognized that a distinctly different and valuable function could be introduced while inflowing and treating a particle-laden fluid in a cyclone separator.

In such a procedure, the length of the vortex can be changed, without necessarily terminating or otherwise changing the rate or pressure at which the inflowing stream is provided. For example, when the vortex length is shortened by moving the vortex-stabilizer closer to the outlet for the particle-depleted fluid, the result is mainly an increase in the pressure-drop across the cyclone. The increased pressure drop increases the back pressure on the inflowing stream and thus can be used to throttle and/or divert the stream of fluid which is flowed through the vortex and out (as a particle-depleted fluid) while causing only a minor reduction in the efficiency with which the suspended particles are separated.

SUMMARY OF THE INVENTION

The present invention relates to a process for both cleaning and splitting a stream of particle-containing fluid. The particle-containing fluid is flowed into a vortex within a cyclone separator that contains a vortex-stabilizing means which is located between the outflow opening for particle-depleted fluid and the outflow opening for particle-enriched fluid, and is provided with an externally controllable means for moving the vortex stabilizer toward, or away from, the outflow opening for the particle-depleted fluid. The distance between the vortex stabilizing means and the outflow opening for the particle-depleted fluid is adjusted to one which provides a stream of particle-depleted fluid having a selected volume and concentration of particles.

The present invention is applicable to treatments of substantially any hot gas or other fluid which contains suspended particles and is susceptible to separation in a cyclone separator. The suspended particles can be solid, liquid or gaseous at the initial temperature of the hot gas as long as the particles have or attain a phase which is different from, and has a density which is different from, the gas when the particle-suspending gas or fluid is flowed into the cyclone.

DESCRIPTION OF THE INVENTION

Figure 1:
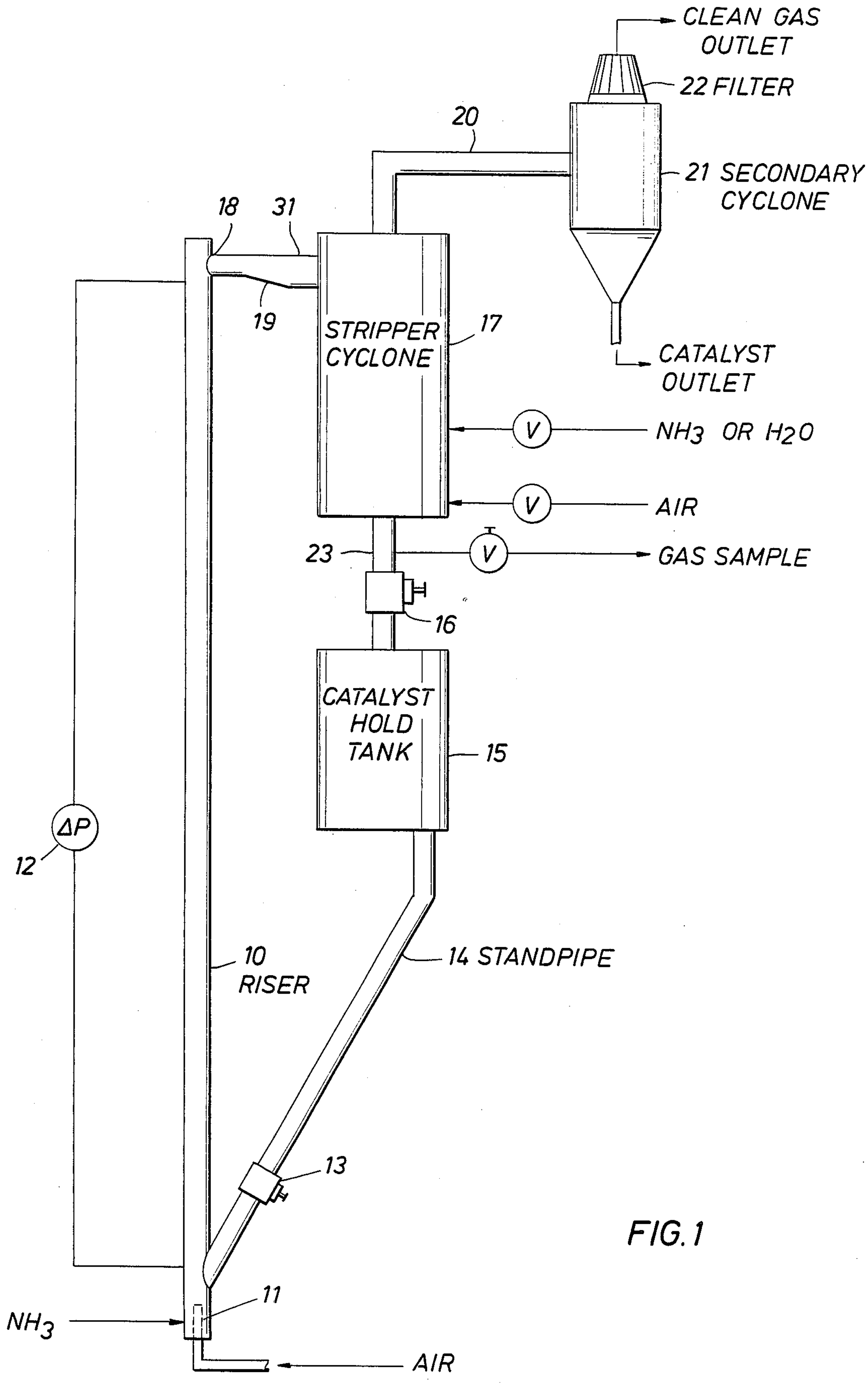
FIG. 1 is a diagrammatic elevation of a test loop used in testing cyclone separators suitable for use in the present invention.

The present invention involves discoveries and/or features such as the following: (1) the separation performance of a cyclone separator can be optimized while the separator is on stream by adjusting a remotely controllable vortex stabilizer, (2) the pressure drop through a plurality of cyclone separators which are connected in parallel through a manifold can be similarly adjusted to equalize the flow through each separator or to terminate or to reduce the flow through a particular separator, (3) the outflow from a cyclone separator outlet may be similarly closed-off completely to terminate a flow of fluid without any downstream valve, (4) the externally controllable vortex stabilizer can be adjusted to control the amount of fluid leaving the separator as a fluid in which a dense component is either enriched or depleted, (5) the process of the present invention is particularly advantageous for controlling the respective volumes of gas or liquid recycle streams which are relatively enriched or depleted regarding solid particles that are both abrasive and more or less dense than the gas or liquid in which they are dispersed while minimizing the eroding of the stream-splitting elements.

The present invention is particularly suitable for use in connection with combustion or gasification processes for converting carbonaceous materials to synthetic gas or liquid. Such combustion reactions tend to produce hot, high-pressured gas which contains suspended particles which may be liquid or vapors, at the reactor temperature, may become tacky at a slightly lower temperature, and then may become sufficiently non-sticky for successful separation in a cyclone at a lower temperature. Such particle-containing gases can be most advantageously quenched by mixing them with a relatively cool and relatively particle-free recycle stream of the gaseous product produced by the reactor. In such processes, the nature and extent of particles contained in the gases and the reactor temperatures may vary due to variations in the type of feed material. For cooler reactor temperatures, less quenching gas is needed and for product gases containing higher concentrations of suspended particles, a more completely particle-depleted quenched gas is needed. In view of such variations, it is extremely beneficial to be able to effect online modifications in the flow rate and concentration of particle-depleted gas which is available for use in quenching the hot product gas.

The present invention is particularly beneficial in improving a process for treating carbonaceous material in which hot gas exhausting from a reactor is quenched to a temperature at which the particles are solidified by mixing the hot gas with gas that is relatively cool and free of particles. In the present process, the quenched reactor exhaust gas is flowed tangentially into a cyclone that contains a generally cylindrical vortex chamber, an outlet opening for particle-depleted gas, an outlet for particle-enriched gas and a vortex stabilizing means which is located between those outflow openings and provided with externally controllable means for adjusting the distance between the stabilizer and the outlet for particle-depleted gas. The distance between that outlet and the vortex stabilizer is adjusted in a frequency, and to an extent required, for adjusting the volume and particle concentration of the particle-depleted gas to what is needed for providing a stream of gas capable of being used as a significant proportion of the quenching gas for cooling the hot reactor exhaust gas. In this way, the cycloning operation provides a stream-splitting operation which minimizes the eroding of the stream-splitting elements.

In coal gasifying processes, such as the slagging gasifier process mentioned in the patents cited above, the hot reactor gas tends to be both corrosive and erosive. The conventional procedures for cleaning and recycling portions of the product gas require valves such as trunion-mounted ball valves with spring-loaded seats that can be turned, online, to increase or decrease flows of such fluids. Experience with pilot plants and larger operations utilizing such particle-depleted product gases for quench gases, have been plagued with uneconomically short life times for such valves. The valves were damaged by fretting, galling, abrasion, erosion and corrosion of the ball seats, and the like. The use of the present cyclone splitter system can eliminate the need for some of the most active of such valves.

TEST SYSTEM

A cyclone separator uses the centrifugal forces in a confined, high velocity vortex to separate phases of different densities. The strength and stability of the vortex are of primary importance in determining both separation efficiency and erosion resistance of a cyclone. Since improved cyclone reliability, separation performance, and erosion resistance are extremely important commercial objectives, studies were undertaken to achieve cyclone modifications which might reduce erosion and improve efficiency. In particular, studies were made of cyclone internals which contained means for stabilizing the vortex. The term "stabilized", is used to mean that the vortex was held in the center of the cyclone and that the turbulent energy dissipation was reduced.

Numerous cyclone flow, velocity, acoustical, and pressure drop experiments were performed at near ambient conditions. Most of these experiments were done with an 18-inch diameter, tangential inlet cyclone which was a 0.31 scale PLEXIGLAS TM model of a second stage FCC commercial cyclone. The scale of the model was chosen to simulate the Reynolds and Strouhal numbers of an actual fluid cracking catalyst (FCC) cyclone at a similar inlet velocity (25 m/sec). The mdel was tested with and without vortex stabilizers of various configurations. Wall roughness was simulated by a 10 mesh, 0.11 cm "thick" wire screen closely fitted to the inside walls of the cyclone. This model is typical of cyclones used in modern catalytic cracking units, except that it is a particularly high efficiency design. The distinguishing features of such a design are a large inlet to outlet area ratio, narrow inlet, and long cyclone body.

Many variations of the basic cyclone were tested to determine the effects of hopper geometry, stabilizer geometry, and wall roughness on the vortex motion in cyclones.

All experiments used air (to simulate gaseous hydrocarbons) as the main flow. The air was supplied by three 400 horsepower blowers, having a total capacity of one standard $m^3$/sec (2100 ACFM). Most of the experiments were done with about 0.6 $m^3$/sec at 117 kPa (17 psia). This flow rate corresponds to an inlet velocity of 17 m/sec. At this flow rate, the Reynolds number based on the outlet tube diameter ($Re_z = \rho_g w_i r_i / \mu$ was approximately $2.8\times10^5$. At such a high Reynolds number the velocity profiles are essentially independent of the flow rate, therefore, the actual flow rate was allowed to vary somewhat, but all measurements were taken at flow rates above 0.5 $m^3$/sec at 110–130 kPa, 16°–29° C. (16–19 psia, 6085° F.). For purposes of comparison, the velocity profiles were all adjusted to an inlet velocity of 17 m/sec.

Cyclones are characterized by large radial pressure gradients which balance the centrifugal forces in the swirling flow. Therefore, there is a relative vacuum at the center, or core, of the vortex. This low pressure core would presumably "suck" on any nearby surface, thus stabilizing an attachment of the vortex to that surface.

Vortex stabilizer means were placed in the model cyclone to forestall the unsteady motion of the vortex.

A vertical pin or vortex finder may be added to the stabilizer to restrict and center the lateral precessional motion of the vortex. It was found that a 0.6 cm diameter stabilizer pin was insufficient to restrict the vortex precession in the test cyclone. The vortex stabilizer was more effective when a larger pin was used to center the vortex. A 1.9 cm diameter rod was tested with better results.

Several types of vortex stabilizer means were tested with varying results. Generally, a flat plate or circular disc was found to be satisfactory. The vortex stabilizer means diameter should be at least about one vortex outlet tube diameter. The maximum stabilizer diameter in a commercial model is set primarily by weight limitations and is limited only by providing an annulus between the perimeter of the stabilizer and the vessel wall large enough to permit catalyst to flow downwardly while simultaneously passing stripping gas in an upwardly direction.

The vortex finder is not critical to cyclone performance provided the vortex stabilizer means are located a short distance from the vortex outlet, i.e., at least about 2–3 vortex outlet tube diameters. However, if the vortex finder is located at a greater distance, say 5–8 vortex outlet tube diameters, then it is preferred that the vortex finder would be greater than about one-third the vortex length.

Based on aerodynamic studies, vortex stabilization appears desirable for increasing separation efficiency while minimizing both pressure loss and erosion. Vortex stabilizers reduced the pressure drop across the model cyclone by 10–15% even though the peak swirl velocities were significantly increased. This behavior is exceptional in cyclones since increasing swirl almost always raises the pressure loss. As the pressure drop goes down, vortex stabilization seems to reduce the turbulent energy dissipation in cyclones.

A test loop was constructed of PLEXIGLAS TM as shown in FIG. 1. Catalyst enters the bottom of a 3-inch by 14-foot riser 10 and is transported by air which enters through a concentric 1½-inch nozzle 11. The differential pressure (ΔP) 12 across the riser was not measured precisely, but was on the order of 1-inch of $H_2O$. Air flow rates of 64 to 103 SCFM were used in the riser 10. These rates correspond to superficial velocities in the riser 22 to 35 ft/sec (4.9 to 7.9 lbs/minute of air). Measurement of air rate was via rotometer. Catalyst flow rates in the riser were varied from 4.6 to 20 lbs/min. Control of solids flow rate was by setting a pinch clamp 13 in a 3-inch diameter standpipe 14 between the catalyst hold tank 15 and the riser 10. The catalyst rate was measured by closing a pinch clamp 16 between the stripper cyclone 17 and the catalyst hold tank 15 and measuring the rate of level increase in the stripper cyclone body. For this measurement air was turned off to the stripper cyclone 17 and a catalyst density of 50 lbs/$ft^3$ was assumed.

At the top of the riser 10 there is a right angle turn 18 and a transition 19 from a 3-inch pipe (7.07 sq.in.) to a 6-inch high by 1½-inch wide rectangular tangential cyclone inlet 31 (9 sq.in.). Gas velocities at the cyclone inlet were varied from 17 to 27.5 ft/sec.

Gas exits from the stripper cyclone 17 via a 3-inch inside diameter (ID) pipe 20. A secondary cyclone 21 collects the catalyst from the stripper cyclone overhead. A paper filter 22 allows clean gas to pass to the atmosphere and catches catalyst which escapes from the secondary cyclone.

Catalyst exits from the stripper cyclone 17 through a standpipe 23. A pinch clamp 16 is used to control the catalyst level in the bottom of the stripper cyclone 17. A catalyst hold tank 15 below the stripper cyclone 17 provides a reservoir which feeds the riser through a 3-inch standpipe 14.

Figure 2:
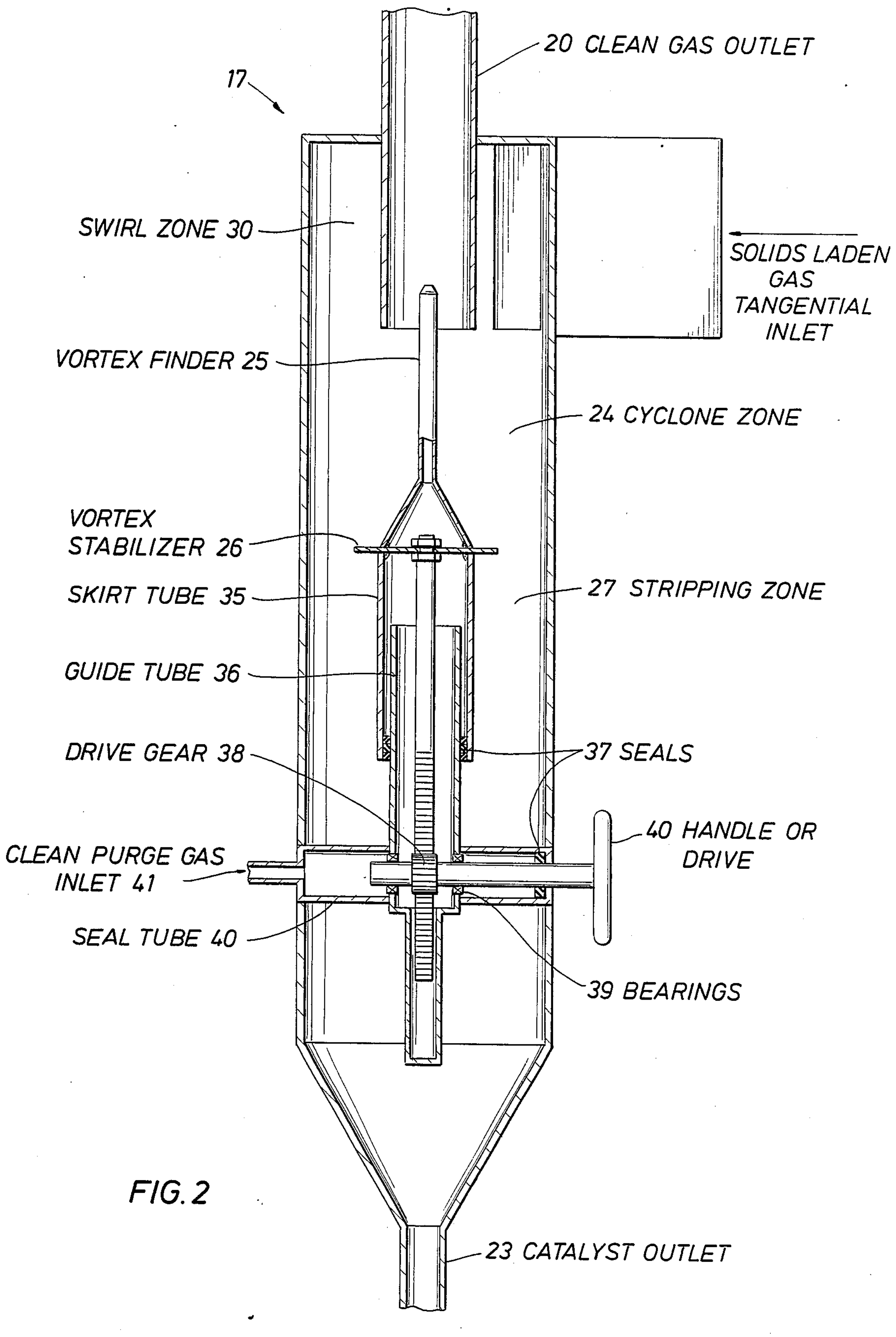
FIG. 2 is a diagrammatic elevation of one embodiment of a cyclone separator of the present invention.

A detailed diagrammatic elevation view of the stripper cyclone 17 is shown in FIG. 2. The cyclone zone 24 was made from a 6-inch inside diameter (ID) pipe and contained a vortex finder 25 and a vortex stabilizer 26 located a selected distance from the bottom of the clean gas outlet pipe 20. The stripping zone 27 was also made from a 6-inch ID pipe. The clean gas outlet 20 was a 3-inch ID pipe with ⅛-inch wall thickness and extended 7 inches through swirl-inducing zone 30 to the top of the cyclone zone 24. The catalyst or separated component outlet 23 was 3-inch ID pipe. The particle-laden gas enters the swirl zone 30 through the tangential inlet 31.

The vortex stabilizer 26 was 4 inches in diameter (for most of the tests), ½-inch thick at the edge and 1-inch thick in the center. The vortex finder 25 was 2½-inches long, ½-inch diameter at the base and ¼-inch diameter at the top.

In the embodiment shown in the drawing, the vortex stabilizer 26 is provided with a skirt tube 35 which surrounds a guide tube 36. Seal rings 37 are arranged to prevent the flow of fluid between the tubes 35 and 36. The vortex stabilizer 26 is vertically movable by means of a rack and pinion drive gear arrangement 38. The drive gear shaft is supported by bearings 39, is surrounded by a seal ring 37, and is provided with a handle or drive 40 which can be operated from a location outside of the cyclone separator.

TEST RESULTS

Tests such as those conducted in apparatus of the type shown using gaseous suspension of solid particles have demonstrated the dependence of the pressure drop across a cyclone separator on the location of the vortex with respect to the upper, particle-depleted fluid outlet. In a test in a cyclone separator having a 20-inch diameter vortex zone, the vortex length was varied between 36 inches and 17 inches. The suspension of particles was inflowed at an inlet pressure of 2-7/16ths pounds per square inch gauge. With the vortex length of 36 inches, the pressure drop from the inlet opening to a particle depeted fluid outlet opening was 7/16ths psi and the pressure drop from the inlet to the particle-enriched fluid outlet was 1/4th psi. When the vortex length was 17 inches, the pressure drop from the inlet to the particle depleted fluid outlet was increased to 1½ psi, although the pressure drop to the particle-enriched fluid outlet was still about ¼th psi. In those tests, the flow split was changed by a factor of about 2 even though the underflow of particle-enriched fluid was not contained within the cyclone separator.

Calculations based on such data indicate that a variation of at least about 20% can be achieved in the flow split without significantly reducing the proportion of particles which are removed. In addition, the positioning of the vortex stabilizer means can be calibrated to indicate the amount of flow split to be expected for each position.

Where the flow of the particle-enriched fluid is contained within the cyclone separator, so that there is no particle-enriched fluid outflow beyond the cyclone, the movement of the vortex stabilizer toward the particle-depleted fluid outlet can increase the pressure drop across the cyclone separator to a point at which the flow of particle-depleted fluid is terminated. In such an operation the cyclone separator is operating as a cut-off valve. Where the inflowing fluid contains suspended solid particles that are apt to erode the seats of the valve, the present apparatus is particularly advantageous. Tests in systems of the type shown have indicated that, in a cyclone separator there is little, if any, wear on the vortex stabilizer, even when the vortex stabilizer is quite close to the particle-depleted fluid outlet. This is due to the fact that the particles which could cause an abrasion are continually thrown radially outward by the cyclonic action, so that substantially the only fluid flowing along the surfaces of the vortex stabilizer or the adjacent edges of the particle-depleted fluid outlet are substantially free of such particles.

In a coal gasification process produced gases which contain suspended particles of unreacted coal and/or fly-ash are desirably cooled by diluting them with a stream of clean recycle gas. The present cyclone separator is particularly well suited for use as an erosion resistant valve for controlling such an operation. Most valves tend to be severely eroded by suspended solids at the elevated pressures and temperatures commonly employed for coal gasification. With the present cyclone separator the solids-laden reaction product can be flowed tangentially so the contaminating solids are spun outward as they would be in an ordinary cyclone. But, with the present system, the flow of the relatively clean recycle gas through the upper outlet can be controlled by simply vertically moving the vortex stabilizer to cause the cyclone separator to act as a vortex valve while also causing the contaminated solids to be carried down and out in a particle-enriched gas stream.

Figure 3:
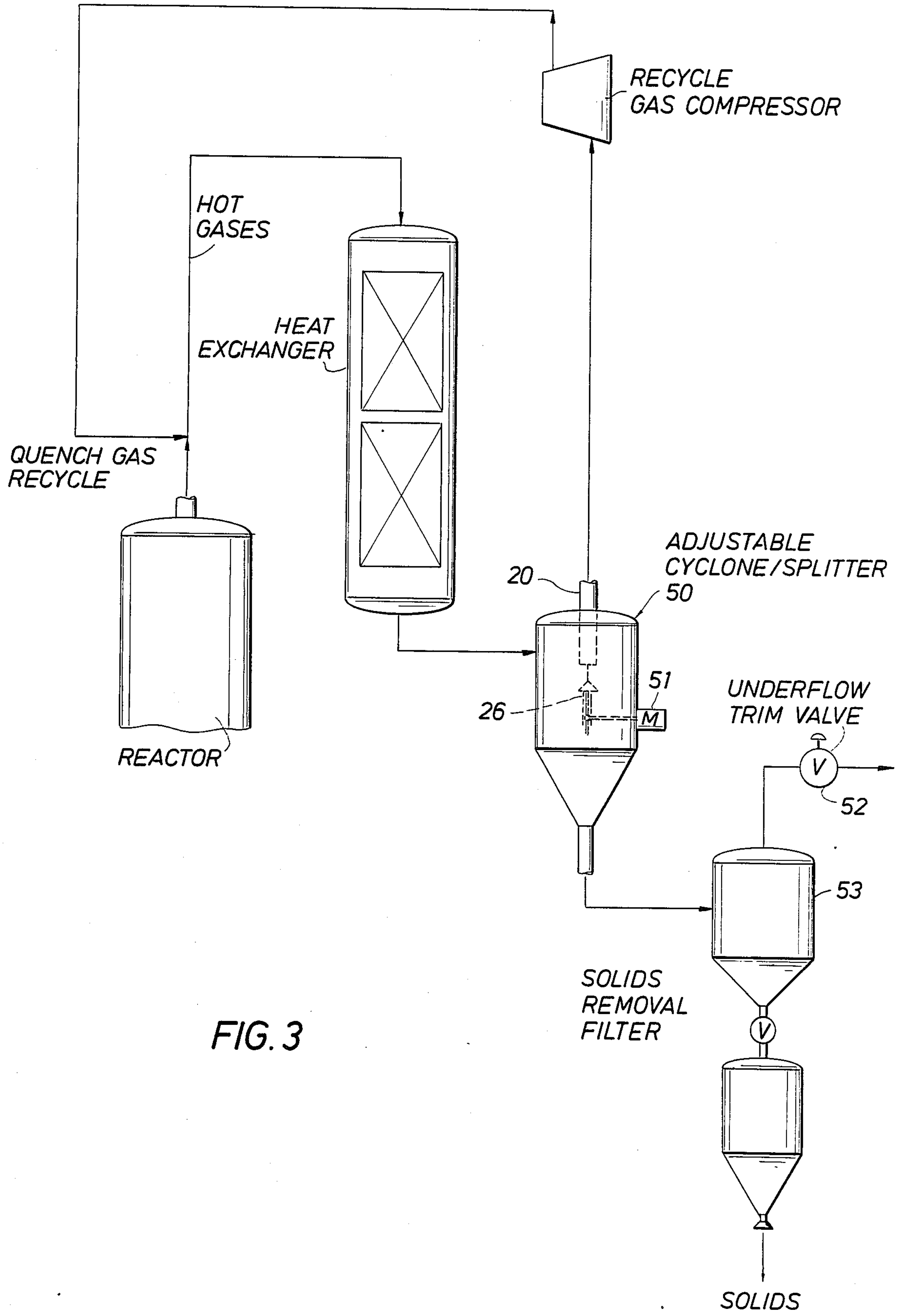
FIG. 3 is a schematic illustration of a quench-gas recycle for a slagging gasifier using an adjustable cyclone splitter of the present invention.

FIG. 3 is a schematic illustration of a slagging coal gasifier system in which cleaned, recycled gas is separated and recycled for use as a quench gas, for example, in a quench zone of the type described in U.S. Pat. No. 4,054,424. As illustrated, the reactor gas is quenched and further cooled in a heat exchanger and then fed into adjustable cyclone splitter 50 of the present invention. The cyclone splitter is adjusted so that the particle concentration of the particle-depleted gas outflow is low enough to be acceptable in a conventional or other recycle gas compressor for pressurizing the gas to the pressure in the reactor and/or quenched zone. Such an adjustment is effected by simply actuating drive motor 51 to adjust the position of the vortex stabilizing means 26 relative to that of the outlet opening 20. In the arrangement shown, substantially the only valve needed to complete the balancing of the streams is a conventional type underflow trim valve 52, arranged for controlling the relatively small stream of gas outflowing from a solids removal filter 53.

Figure 4:
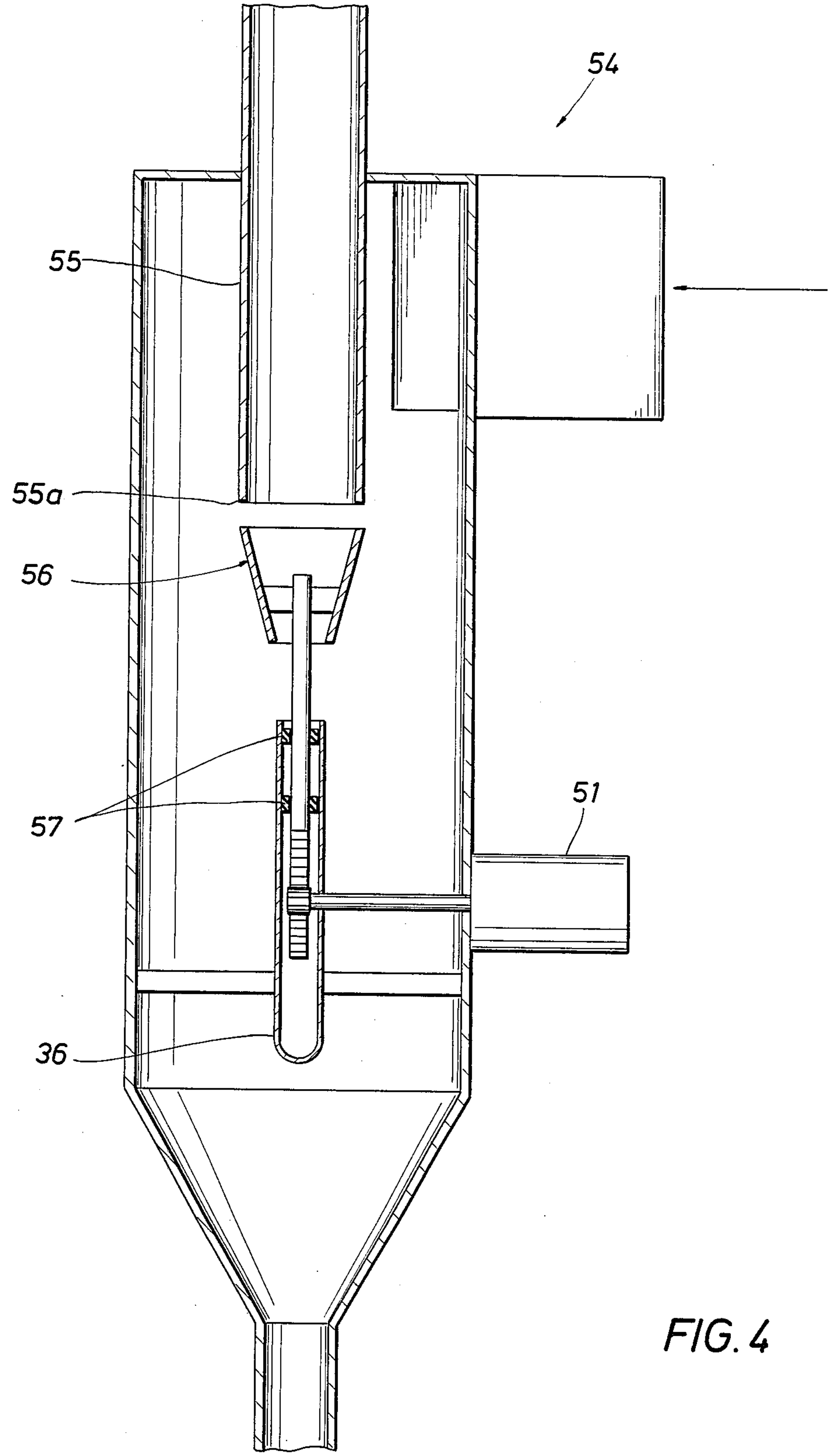
FIG. 4 is a schematic illustration of an alternative embodiment of a cyclone separator of the present invention.

FIG. 4 is a schematic illustration of an alternative embodiment of the present adjustable cyclone splitter. As shown the cyclone splitter 54 contains a particle-depleted gas outlet 55 provided with wear-resistant lower edge 55a. A vortex stabilizing means 56 is arranged as a truncated cone to enhance its ability for adjusting the rate of outflow of particle-depleted fluid while avoiding any significant degree of erosion. The particle-depleted fluid may exhaust either through the gap between 55a and 56 or through the apex of the truncated cone 56. The truncated cone is raised or lowered within a centralized guide tube such as tube 36, which can be provided with a purge gas inlet, such as inlet 41 (of FIG. 2), if desired.

As will be apparent to those skilled in the art, where an adjustable cyclone splitter of the present invention is being used for a relatively consistent operation such as the gasification of a particular and relatively consistent coal, static flow controlling elements such as those presently available can advantageously be incorporated into the flow lines upstream and downstream from the cyclone splitter. This can maintain a flow such that when the cyclone vortex stabilizing means is adjusted for maximum particle separating efficiency, the particle-depleted gas produced by the cyclone has substantially the volume and concentration of particles desired for use in quenching the reaction products from the type feed material being used.

Where large volumes of solid particles suspended in large volumes of gas are to be separated, such as is common in catalytic cracking and various other manufacturing processes, pluralities of cyclone separators are often operated in parallel, with each separator being connected to receive a portion of a solids-laden stream from a manifold, with the separated solids being discharged into a common hopper For example, it is common for 8 cyclone separators to be manifolded together to receive catalyst-laden flue gas from a regenerator. In such operations it is difficult to feed all of the cyclones equally and collected solids from some of them are apt to flow through the hopper and back into flue gas flowing through other cyclones. However, when using the present cyclone separators the vortex stabilizers can be adjusted, without interrupting the operation, in order to control the flow split between the separators operating in parallel.

In general, the present invention is useful in separating solids, liquids or gaseous particles which are dispersed in a gaseous or liquid fluid having a density different from that of the particles. The present process may be used to control the flow split between the outflows of either particle-depleted or particle-enriched fluid. Particularly in a situation where the particle-enriched fluid is contained in a chamber adjoining the vortex chamber of the separator, the present invention can be used as a valve for controlling the flow of a fluid containing abrasive particles by altering the pressure drop through the cyclone separator or terminating the flow in a manner that avoids any significant erosion due to abrasion.

What is claimed is:

1. In a reaction process in which particle-containing hot gas exhausting from a reactor is quenched to a temperature at which the particles become susceptible to cyclonic separation by mixing the hot gas with a relatively cool and particle-free gas, an improvement comprising:

quenching the hot reactor exhaust gas and flowing the quenched gas tangentially into a cyclone having a generally cylindrical vortex chamber with a particle-depleted fluid outflow opening near one end and a particle-enriched outflow opening near the other end, and an intermediately located vortex stabilizing means having an externally controllable means for adjusting the distance between the stabilizing means and the particle-depleted outflow opening; and adjusting the distance between the particle-depleted fluid outflow opening and the vortex stabilizer means in a frequency, and to an extent required for adjusting the volume and particle concentration of the particle-depleted fluid so that it provides a stream of fluid capable of serving as at least a substantial proportion of the quenching gas which is mixed with hot reactor exhaust gas; and thus, the cyclonic operation provides a cleaning and stream-splitting valving operation that minimizes the eroding of stream-splitting elements.

2. The process of claim 1 in which the reaction process is a slagging coal gasification process.

3. The process of claim 1 in which static flow controlling elements are incorporated into conduits upstream and downstream from said cyclone and are arranged so that the volume of particle-depleted gas is suitable for said quenching operation when the vortex stabilizing means within the cyclone is adjusted for maximum particle separating efficiency.

* * * * *